US011745077B1

(12) United States Patent
Lewis et al.

(10) Patent No.: US 11,745,077 B1
(45) Date of Patent: Sep. 5, 2023

(54) SYSTEM AND METHOD FOR A USER ADAPTIVE TRAINING AND GAMING PLATFORM

(71) Applicant: TOCA Football, Inc., Costa Mesa, CA (US)

(72) Inventors: Edward J. Lewis, Thousand Oaks, CA (US); Conrad Spiteri, Thames Ditton (GB); Steven Eannarino, Costa Mesa, CA (US)

(73) Assignee: TOCA Football, Inc., Costa Mesa, CA (US)

( * ) Notice: Subject to any disclaimer, the term of this patent is extended or adjusted under 35 U.S.C. 154(b) by 0 days.

(21) Appl. No.: 17/562,270

(22) Filed: Dec. 27, 2021

Related U.S. Application Data

(63) Continuation of application No. 16/686,003, filed on Nov. 15, 2019, now Pat. No. 11,207,582.

(51) Int. Cl.
*A63B 69/40* (2006.01)
*A63B 24/00* (2006.01)
(Continued)

(52) U.S. Cl.
CPC .......... *A63B 69/406* (2013.01); *A63B 69/002* (2013.01); *A63B 69/0053* (2013.01);
(Continued)

(58) Field of Classification Search
CPC ............ A63B 24/0021; A63B 24/0062; A63B 24/0075; A63B 69/002; A63B 69/0053;
(Continued)

(56) References Cited

U.S. PATENT DOCUMENTS 3,913,552 A * 10/1975 Yarur .................... A63B 69/406
124/78
3,918,711 A * 11/1975 Zak ........................ A63B 69/38
473/197
(Continued)

FOREIGN PATENT DOCUMENTS

KR 20160124254 A 10/2016

OTHER PUBLICATIONS

Anon., "Epipolar geometry" https://en.wikipedia.org/wiki/Epipolar_geometry, last accessed May 4, 2020.
(Continued)

*Primary Examiner* — Alexander R Niconovich
(74) *Attorney, Agent, or Firm* — Rutan & Tucker, LLP; Kyle M. St. James

(57) ABSTRACT

A method for adaptive user training and gaming utilizing a media player is disclosed. The method includes operations of receiving, by control logic, data pertaining to selection of a first training program, transmitting, by the control logic, media instructions to cause activation of a media player configured to display visual data corresponding to the first training program, and transmitting, by the control logic, ball-throwing instructions to cause activation of a ball-throwing machine configured to impart motion to one or more balls in accordance with the first training program. The method includes additional operations of recording, by the control logic, an indication of the first training program in a player profile. Additional operations includes recording, by the control logic, training data indicating metrics associated with performance of the first training program.

20 Claims, 9 Drawing Sheets

(51) Int. Cl.
 *A63B 69/00* (2006.01)
 *A63B 71/06* (2006.01)
(52) U.S. Cl.
 CPC .... *A63B 71/0622* (2013.01); *A63B 2069/402* (2013.01); *A63B 2225/50* (2013.01)
(58) Field of Classification Search
 CPC .............. A63B 69/406; A63B 71/0622; A63B 2024/0025; A63B 2024/0028; A63B 2024/0031; A63B 2024/0034; A63B 2069/402; A63B 2220/806; A63B 2220/807; A63B 2225/50; G09B 19/0038
 USPC ..... 124/6, 8, 9, 78; 473/422, 446, 470, 471; 700/91; 434/247; 482/900, 901
 See application file for complete search history.

(56) References Cited

U.S. PATENT DOCUMENTS

| | | | | |
|---|---|---|---|---|
| 3,989,246 A * | 11/1976 | Brown | A63B 47/025 | 124/53.5 |
| 4,025,071 A * | 5/1977 | Hodges | A63B 69/406 | 198/677 |
| 4,029,315 A * | 6/1977 | Bon | A61B 5/16 | 273/374 |
| 4,150,825 A * | 4/1979 | Wilson | A63B 69/3658 | 473/152 |
| 4,442,823 A * | 4/1984 | Floyd | A63B 69/406 | 124/78 |
| 4,535,992 A * | 8/1985 | Slagle | A63B 69/3685 | 473/230 |
| 4,645,458 A * | 2/1987 | Williams | A63B 69/0053 | 482/901 |
| 4,751,642 A * | 6/1988 | Silva | A63B 69/00 | 463/43 |
| 4,882,676 A * | 11/1989 | Van De Kop | A63D 15/006 | 473/2 |
| 4,915,384 A * | 4/1990 | Bear | A63B 69/3614 | 473/154 |
| 4,919,428 A * | 4/1990 | Perkins | A63B 53/0487 | 473/328 |
| 5,107,820 A * | 4/1992 | Salansky | A63B 69/40 | 124/78 |
| 5,125,653 A * | 6/1992 | Kovacs | A63B 69/406 | 124/78 |
| 5,188,367 A * | 2/1993 | Gipe | A63B 69/36213 | 473/229 |
| 5,264,765 A * | 11/1993 | Pecorino | H04N 5/65 | 902/20 |
| 5,342,041 A * | 8/1994 | Agulnek | A63B 24/0003 | 473/446 |
| 5,344,137 A * | 9/1994 | Komori | A63B 69/40 | 124/36 |
| 5,359,986 A * | 11/1994 | Magrath, III | A63B 69/406 | 124/78 |
| 5,365,427 A * | 11/1994 | Soignet | A63B 69/00 | 473/448 |
| 5,438,518 A * | 8/1995 | Bianco | A63B 69/3605 | 702/159 |
| 5,447,314 A * | 9/1995 | Yamazaki | A63B 43/00 | 473/353 |
| 5,464,208 A * | 11/1995 | Pierce | A63B 69/406 | 124/78 |
| 5,465,978 A * | 11/1995 | Magnone | A63B 69/408 | 473/446 |
| 5,489,099 A * | 2/1996 | Rankin | A63B 24/0003 | 473/409 |
| 5,490,493 A * | 2/1996 | Salansky | A63B 69/40 | 124/78 |
| 5,498,000 A * | 3/1996 | Cuneo | A63B 63/06 | 473/478 |
| 5,556,106 A * | 9/1996 | Jurcisin | A63B 63/00 | 273/395 |
| 5,649,523 A * | 7/1997 | Scott | A63B 69/406 | 124/78 |
| 5,683,302 A * | 11/1997 | Harrell | A63D 5/04 | 473/58 |
| 5,697,791 A * | 12/1997 | Nashner | A63B 69/00 | 434/254 |
| 5,722,384 A * | 3/1998 | Cox | A63B 69/40 | 124/78 |
| 5,768,151 A * | 6/1998 | Lowy | A63B 24/0021 | 273/317.1 |
| 5,860,873 A * | 1/1999 | Karasavas | A63B 69/3635 | 473/282 |
| 5,868,578 A * | 2/1999 | Baum | A63B 24/0021 | 434/257 |
| 5,873,797 A * | 2/1999 | Garn | A63B 55/61 | 473/409 |
| 5,882,204 A * | 3/1999 | Iannazo | A63B 24/0021 | 473/422 |
| 5,897,445 A * | 4/1999 | Sanders | A63B 24/0003 | 473/421 |
| 5,911,214 A * | 6/1999 | Andrews | A63B 69/408 | 124/16 |
| 5,938,545 A * | 8/1999 | Cooper | A63B 69/3658 | 473/407 |
| 6,042,492 A * | 3/2000 | Baum | A63B 69/0002 | 434/257 |
| 6,073,489 A * | 6/2000 | French | A63B 69/0053 | 73/379.01 |
| 6,082,350 A * | 7/2000 | Crews | A63B 69/406 | 124/78 |
| 6,098,458 A * | 8/2000 | French | A63B 24/0021 | 73/379.04 |
| 6,179,720 B1 * | 1/2001 | Rankin | A63B 69/3658 | 473/154 |
| 6,182,649 B1 * | 2/2001 | Battersby | G09B 19/0038 | 124/78 |
| 6,190,271 B1 * | 2/2001 | Rappaport | A63B 69/0002 | 124/78 |
| 6,237,583 B1 * | 5/2001 | Ripley | A63B 69/406 | 124/78 |
| 6,263,279 B1 * | 7/2001 | Bianco | A63B 69/36 | 701/461 |
| 6,308,565 B1 * | 10/2001 | French | A63B 24/0021 | 73/379.04 |
| 6,320,173 B1 * | 11/2001 | Vock | A63B 24/0003 | 250/206.1 |
| 6,533,675 B2 * | 3/2003 | Funk | A63B 24/0003 | 473/222 |
| 6,539,931 B2 * | 4/2003 | Trajkovic | A63B 24/00 | 124/78 |
| 6,565,448 B2 * | 5/2003 | Cameron | A63B 53/007 | 473/409 |
| 6,707,487 B1 * | 3/2004 | Aman | G06T 9/00 | 348/169 |
| 6,774,349 B2 * | 8/2004 | Vock | G01S 3/7864 | 463/2 |
| 6,816,185 B2 * | 11/2004 | Harmath | A63B 71/0605 | 340/384.1 |
| 7,040,998 B2 * | 5/2006 | Jolliffe | A63B 71/0605 | 473/409 |
| 7,082,938 B2 * | 8/2006 | Wilmot | A63B 69/406 | 124/78 |
| 7,335,116 B2 * | 2/2008 | Petrov | F41H 5/007 | 473/407 |
| 7,559,163 B2 * | 7/2009 | Ofuji | G03B 21/58 | 40/606.12 |
| 7,610,909 B2 * | 11/2009 | Greene, Jr. | A63B 69/406 | 124/78 |
| 7,815,525 B2 * | 10/2010 | Small | A63B 43/00 | 463/40 |
| 7,850,536 B1 * | 12/2010 | Fitzgerald | A63B 69/3682 | 473/220 |
| 7,882,831 B2 * | 2/2011 | Alger | A63B 69/002 | 124/78 |
| 7,920,052 B2 * | 4/2011 | Costabile | A63B 71/0669 | 340/323 R |

(56) References Cited

U.S. PATENT DOCUMENTS

| | | | | |
|---|---|---|---|---|
| 8,142,267 B2* | 3/2012 | Adams | A63B 24/0006 | 463/2 |
| 8,164,830 B2* | 4/2012 | Astill | A63B 71/0619 | 359/461 |
| 8,210,959 B2* | 7/2012 | Balardeta | A63B 24/0021 | 473/407 |
| 8,292,733 B2* | 10/2012 | Crawford | A63D 5/04 | 463/31 |
| 8,444,499 B2* | 5/2013 | Balardeta | A63B 69/3658 | 473/409 |
| 8,597,142 B2* | 12/2013 | Mayles | A63F 13/213 | 473/226 |
| 8,617,008 B2* | 12/2013 | Marty | G06T 7/70 | 473/422 |
| 8,705,799 B2* | 4/2014 | White | A63B 69/3658 | 348/157 |
| 8,840,483 B1* | 9/2014 | Steusloff | A63B 53/14 | 473/223 |
| 8,893,698 B2* | 11/2014 | Boehner | A63B 69/406 | 124/78 |
| 8,992,346 B1* | 3/2015 | Raposo | A63B 57/00 | 473/409 |
| 9,010,309 B2* | 4/2015 | Lewis | A63B 69/40 | 124/78 |
| 9,017,188 B2* | 4/2015 | Joseph | G01S 13/66 | |
| 9,050,519 B1* | 6/2015 | Ehlers | G09B 19/0038 | |
| 9,162,134 B2* | 10/2015 | Schwartz | A63B 71/06 | |
| 9,216,330 B2* | 12/2015 | Beck | A63B 53/06 | |
| 9,233,292 B2* | 1/2016 | Joseph | G01S 13/582 | |
| 9,469,945 B2* | 10/2016 | Khurgin | E01C 11/26 | |
| 9,586,099 B2* | 3/2017 | Holthouse | A63B 24/0021 | |
| 9,616,346 B2* | 4/2017 | Nicora | A63B 24/0021 | |
| 9,625,321 B2* | 4/2017 | Cavallaro | G01S 17/18 | |
| 9,724,584 B1* | 8/2017 | Campbell | A63B 69/0071 | |
| 9,782,648 B2* | 10/2017 | DeCarlo | A61B 5/6895 | |
| 9,901,776 B2* | 2/2018 | Mettler | A63B 60/46 | |
| 9,901,804 B2* | 2/2018 | Vollbrecht | A63B 24/003 | |
| 9,968,837 B2* | 5/2018 | Johnston | A63B 43/008 | |
| 9,999,823 B2* | 6/2018 | Chen | A63B 69/3658 | |
| 10,092,793 B1 | 10/2018 | Marty et al. | | |
| 10,300,361 B2* | 5/2019 | Khazanov | A63B 24/0075 | |
| 10,360,685 B2* | 7/2019 | Marty | A63B 71/0605 | |
| 10,380,409 B2 | 8/2019 | Thornbrue et al. | | |
| 10,398,957 B2* | 9/2019 | Altshuler | G09B 19/0038 | |
| 10,456,645 B2* | 10/2019 | Joo | A63B 24/00 | 473/415 |
| 10,486,024 B2* | 11/2019 | Joo | A63B 24/0021 | |
| 10,486,043 B2* | 11/2019 | Joo | A63B 69/00 | |
| 10,489,656 B2 | 11/2019 | Lee et al. | | |
| 10,600,334 B1* | 3/2020 | Zhang | A63B 24/0062 | |
| 10,653,936 B2* | 5/2020 | Ganzer | A63C 19/065 | |
| 10,695,637 B2* | 6/2020 | Hennessy | G06N 5/04 | |
| 10,974,121 B2* | 4/2021 | Thornbrue | G01C 21/16 | |
| 11,207,582 B2* | 12/2021 | Lewis | A63B 69/0053 | |
| 2002/0148455 A1 | 10/2002 | Trajkovic et al. | | |
| 2003/0008731 A1* | 1/2003 | Anderson | A63B 60/42 | 473/407 |
| 2003/0092497 A1* | 5/2003 | Holcomb | A63B 69/3623 | 473/219 |
| 2003/0109322 A1* | 6/2003 | Funk | A63B 69/3623 | 473/219 |
| 2003/0142210 A1* | 7/2003 | Carlbom | G01S 11/12 | 348/157 |
| 2003/0195052 A1* | 10/2003 | Cohen | A63B 57/40 | 473/151 |
| 2004/0058749 A1* | 3/2004 | Pirritano | A63B 43/00 | 473/353 |
| 2004/0061324 A1* | 4/2004 | Howard | G06K 19/0718 | 283/69 |
| 2004/0063521 A1* | 4/2004 | Oister | A63B 24/0021 | 473/476 |
| 2004/0171388 A1* | 9/2004 | Couronne | G01S 5/06 | 455/456.1 |
| 2004/0185952 A1* | 9/2004 | Marshall | A63B 71/0605 | 473/151 |
| 2005/0143199 A1* | 6/2005 | Saroyan | A63B 71/0605 | 473/438 |
| 2005/0197198 A1* | 9/2005 | Otten | A63B 69/3614 | 473/221 |
| 2005/0227792 A1* | 10/2005 | McCreary | A63B 24/0021 | 473/409 |
| 2005/0272517 A1* | 12/2005 | Funk | A63B 24/0003 | 473/222 |
| 2005/0288119 A1* | 12/2005 | Wang | A63B 69/36 | 473/223 |
| 2006/0118096 A1* | 6/2006 | Cucjen | A63B 69/406 | 124/78 |
| 2006/0236993 A1* | 10/2006 | Cucjen | A63B 69/406 | 124/78 |
| 2006/0247070 A1* | 11/2006 | Funk | A63B 69/3623 | 473/222 |
| 2006/0281061 A1* | 12/2006 | Hightower | G09B 9/00 | 434/247 |
| 2007/0021226 A1* | 1/2007 | Tyroler | A63B 71/06 | 473/131 |
| 2007/0021242 A1* | 1/2007 | Krickler | A63B 69/0002 | 473/453 |
| 2007/0238539 A1* | 10/2007 | Dawe | A63B 24/0021 | 473/131 |
| 2008/0146365 A1* | 6/2008 | Miesak | A63B 24/0021 | 473/221 |
| 2008/0192116 A1* | 8/2008 | Tamir | G06T 7/292 | 348/157 |
| 2008/0287207 A1* | 11/2008 | Manwaring | A63B 69/3623 | 473/409 |
| 2008/0300071 A1* | 12/2008 | Valaika | G09B 19/0038 | 473/422 |
| 2009/0048039 A1* | 2/2009 | Holthouse | A43B 3/34 | 342/463 |
| 2009/0210078 A1* | 8/2009 | Crowley | G06Q 30/02 | 700/91 |
| 2010/0032904 A1* | 2/2010 | Yasuoka | A63F 13/213 | 124/78 |
| 2010/0041498 A1 | 2/2010 | Adams | | |
| 2010/0137079 A1* | 6/2010 | Burke | G06T 7/70 | 473/446 |
| 2010/0148445 A1* | 6/2010 | Wilkins | B65G 15/44 | 198/470.1 |
| 2010/0151955 A1* | 6/2010 | Holden | A63B 24/0021 | 473/409 |
| 2010/0184534 A1* | 7/2010 | Chan | G01W 1/10 | 473/415 |
| 2010/0210377 A1* | 8/2010 | Lock | A63B 69/3658 | 473/409 |
| 2010/0261557 A1* | 10/2010 | Joseph | G09B 19/0038 | 473/433 |
| 2011/0028230 A1* | 2/2011 | Balardeta | A63B 69/3658 | 473/409 |
| 2011/0143848 A1* | 6/2011 | Balardeta | A63B 69/3632 | 473/221 |
| 2011/0143849 A1* | 6/2011 | Balardeta | A63B 24/0021 | 473/223 |
| 2011/0151986 A1* | 6/2011 | Denton | A63B 24/0021 | 307/112 |
| 2011/0224025 A1* | 9/2011 | Balardeta | G01S 19/19 | 473/407 |
| 2012/0015753 A1* | 1/2012 | Denton | A63B 69/3658 | 473/409 |
| 2012/0015754 A1* | 1/2012 | Balardeta | A63B 69/3658 | 473/409 |
| 2012/0029666 A1* | 2/2012 | Crowley | A63B 69/002 | 700/91 |
| 2012/0172148 A1* | 7/2012 | Freeman | G01S 19/51 | 473/409 |
| 2012/0238381 A1* | 9/2012 | Denton | A63B 69/3658 | 473/409 |
| 2012/0303207 A1* | 11/2012 | Reindl | G06Q 10/00 | 701/32.4 |

(56) References Cited

U.S. PATENT DOCUMENTS

| | | | | |
|---|---|---|---|---|
| 2012/0309554 A1* | 12/2012 | Gibbs | A63B 69/3621 | 473/409 |
| 2012/0322568 A1* | 12/2012 | Lindeman | G09B 19/0038 | 473/409 |
| 2013/0005512 A1* | 1/2013 | Joseph | G01S 13/66 | 473/431 |
| 2013/0018494 A1* | 1/2013 | Amini | A63B 24/0006 | 700/91 |
| 2013/0095961 A1* | 4/2013 | Marty | A63B 24/0084 | 473/450 |
| 2013/0104869 A1 | 5/2013 | Lewis et al. | | |
| 2013/0157786 A1 | 6/2013 | Joseph et al. | | |
| 2013/0210563 A1* | 8/2013 | Hollinger | A63B 37/0003 | 473/570 |
| 2013/0225305 A1* | 8/2013 | Yang | H04N 13/30 | 463/32 |
| 2013/0317634 A1* | 11/2013 | French | A63B 69/0053 | 700/91 |
| 2013/0324310 A1* | 12/2013 | Leech | A63B 37/00221 | 473/378 |
| 2014/0128171 A1* | 5/2014 | Anderson | G01S 19/19 | 473/199 |
| 2015/0202508 A1* | 7/2015 | Wise, Jr. | H04M 1/72412 | 473/406 |
| 2015/0292261 A1* | 10/2015 | Chou | E06B 9/42 | 160/138 |
| 2016/0008662 A1* | 1/2016 | Cronin | H04N 23/695 | 382/103 |
| 2016/0023042 A1* | 1/2016 | Cherry | G01S 19/19 | 473/353 |
| 2016/0023083 A1* | 1/2016 | Tawwater | A63F 13/00 | 473/156 |
| 2016/0074735 A1* | 3/2016 | Dawe | A63B 71/06 | 463/3 |
| 2016/0158626 A1* | 6/2016 | Dolige | A63B 24/0003 | 700/92 |
| 2016/0193500 A1* | 7/2016 | Webster | G09B 19/0038 | 434/247 |
| 2017/0021259 A1* | 1/2017 | Dismuke | G16H 20/30 | |
| 2017/0120132 A1* | 5/2017 | Shin | H04N 5/77 | |
| 2017/0157484 A1 | 6/2017 | Altshuler et al. | | |
| 2017/0182361 A1* | 6/2017 | Tuxen | G06T 7/74 | |
| 2017/0189753 A1* | 7/2017 | Polifka | A63B 24/0021 | |
| 2017/0203182 A1* | 7/2017 | Spelman | A63B 69/3614 | |
| 2017/0259144 A1* | 9/2017 | Eddie | A63B 69/002 | |
| 2017/0259145 A1* | 9/2017 | Kline | H05B 45/10 | |
| 2017/0274262 A1* | 9/2017 | Sanchez | A63B 69/362 | |
| 2017/0291093 A1* | 10/2017 | Janssen | A63B 69/00 | |
| 2017/0304705 A1* | 10/2017 | Hermandorfer | A63B 69/0002 | |
| 2017/0319930 A1* | 11/2017 | Lewis | A63B 24/0075 | |
| 2017/0333777 A1* | 11/2017 | Spivak | G06T 7/246 | |
| 2017/0340943 A1* | 11/2017 | Pierotti | A63B 24/0087 | |
| 2018/0036590 A1* | 2/2018 | DeAngelis | G06Q 50/28 | |
| 2018/0036616 A1* | 2/2018 | McKenney | A63B 69/002 | |
| 2018/0056124 A1* | 3/2018 | Marty | A63B 69/0071 | |
| 2018/0071577 A1* | 3/2018 | Swartz | A63B 24/0006 | |
| 2018/0140917 A1* | 5/2018 | Song | A63B 24/0006 | |
| 2018/0189971 A1* | 7/2018 | Hildreth | A63H 27/12 | |
| 2019/0087661 A1* | 3/2019 | Lee | G06V 10/82 | |
| 2020/0298087 A1* | 9/2020 | Hermandorfer | A63B 69/0002 | |
| 2021/0146218 A1 | 5/2021 | Lewis et al. | | |
| 2022/0051419 A1* | 2/2022 | Spiteri | G06T 7/70 | |

OTHER PUBLICATIONS

U.S. Appl. No. 16/686,003, filed Nov. 15, 2019 Advisory Action dated Aug. 10, 2021.

U.S. Appl. No. 16/686,003, filed Nov. 15, 2019 Final Office Action dated May 19, 2021.

U.S. Appl. No. 16/686,003, filed Nov. 15, 2019 Non-Final Office Action dated Dec. 7, 2020.

U.S. Appl. No. 16/686,003, filed Nov. 15, 2019 Notice of Allowance dated Sep. 1, 2021.

* cited by examiner

SYSTEM AND METHOD FOR A USER ADAPTIVE TRAINING AND GAMING PLATFORM

CROSS-REFERENCE TO RELATED APPLICATIONS

This application is a continuation of U.S. patent application Ser. No. 16/686,003 filed Nov. 15, 2019, now U.S. Pat. No. 11,207,582 issued Dec. 28, 2021, the entire contents of which are incorporated by reference herein.

FIELD

Embodiments of the disclosure relate to the field of user adaptive training and entertainment platforms. More specifically, one embodiment of the disclosure relates to a system for providing a player with a plurality of soccer balls from a ball-throwing machine according to a selected program wherein a plurality of cameras obtain tracking data.

BACKGROUND

In soccer, to be in control of the ball is of importance to every level of player. The ability to control an awkward bouncing ball quickly and effectively gives the player with the ball the immediate advantage. First touch is often the difference between success and failure in most situations during the match. Additionally, accuracy in passing and shooting a ball is essential in developing a well-rounded game.

As players get older, the game gets faster and demands more speed. Consequently, there is a greater need for accurate shooting and passing. Often, players cannot always place a ball, either to score a goal or even to place a shot within a specific location of the goal—e.g., out of the reach of the goalie; therefore, a player may miss out on an opportunity to score a goal.

Players can improve the accuracy of their shooting and passing by performing shooting and passing drills. Often, however, a player is unable to concentrate on keeping track of the location of each pass or shot within a goal or other area during drills involving several balls. Therefore, by the end of the drill, a player typically does not remember his/her accuracy and cannot determine whether he/she is improving based on results of previous drills.

Additionally, although players may utilize video recording to review their training sessions or game play, a player may not understand the proper mechanics of performing certain moves or drills, and as a result, fail to learn anything from merely watching a video recording. Video recording technologies exist in which a video is captured of a ball (such as a golf ball) being hit from a static position with computer analysis performed on the player's swing. However, most sports are not limited to hitting a static ball; therefore, current technologies used to analyze a golf swing cannot be applied to analyze all aspects of other sports in which a critical component of the game is receiving a moving object.

BRIEF DESCRIPTION OF THE DRAWINGS

The features disclosed herein are described below with reference to the drawings. Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1:
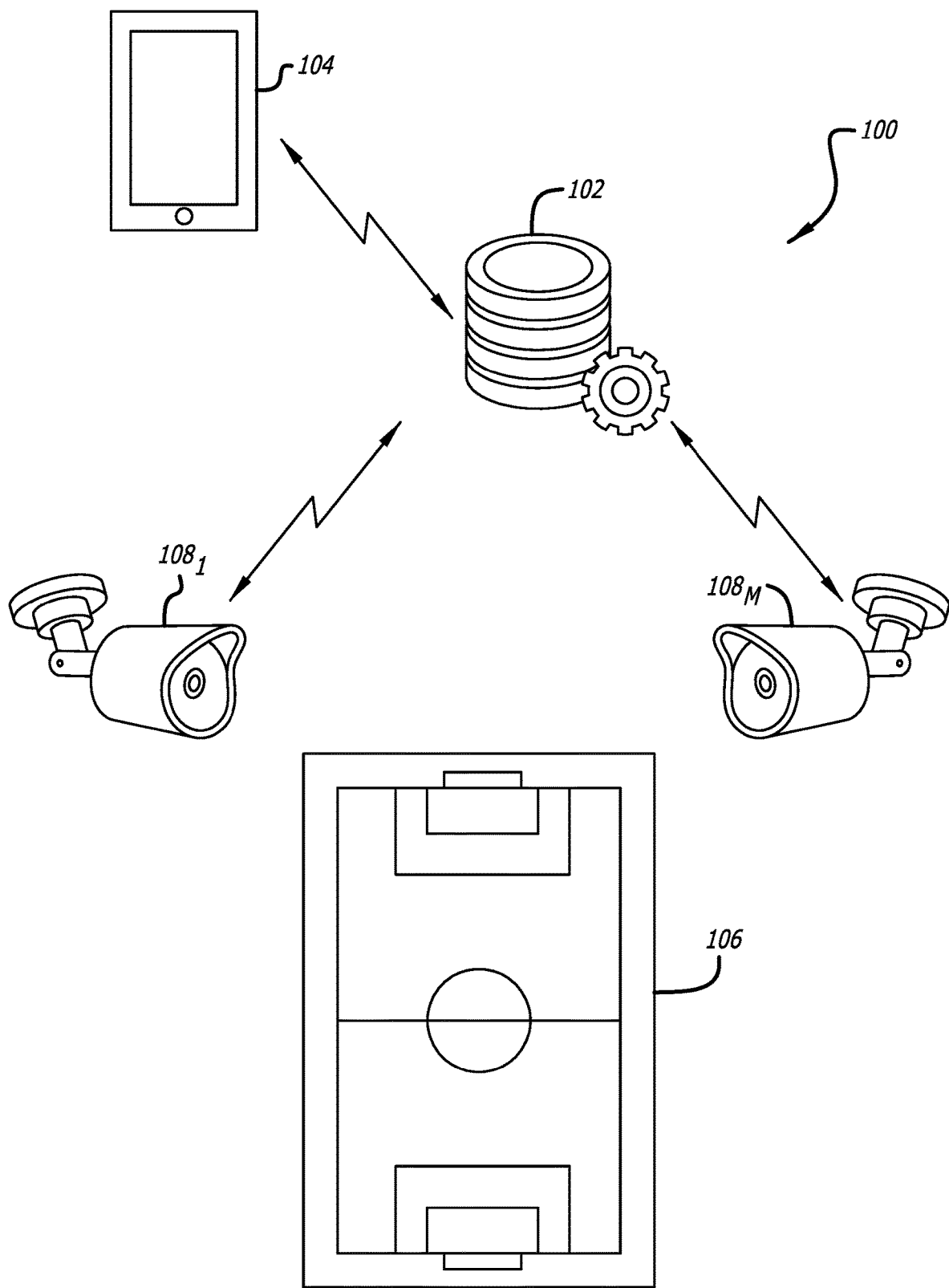
FIG. 1 illustrates an embodiment of a networked environment including a training and entertainment ball-throwing (TEBT) system, in accordance with some embodiments.

As described above, a soccer player's first touch of the ball is an important core skill to develop. A touch can be as simple as receiving a slow pass on the ground or as difficult as taking a top speed knuckling ball out of the air and straight down onto one's foot. First touch development is a continual process; youth and professionals alike perpetually train to ever improve their first touch and ball handling skills. The skill of touch is typically trained by players forming pairs and passing the ball to one another. This training method can produce results but tends to fall short in providing a disciplined approach to training that enables progress measurement and goal-oriented improvement. Further, this technique requires a player to find another individual with which to practice, which is not always practical, particularly for serious athletes who devote significant time to their training. In addition, in order to continually improve one's shooting accuracy, a goal or some form of target is required that is able to withstand repeated physical impact.

Even when a player is able to find another to practice with and/or find a goal or other physical target, a player may practice by repeatedly receiving balls to be trapped, practicing performing various dribbling moves, and/or striking the ball at the goal. However, repeatedly performing the same movements in an improper form leads to the development of bad habits and may prevent the player from reaching his or her full potential. Therefore, without any instruction as to how the player is receiving a ball, passing or otherwise striking the ball, and/or performing various moves, the player may form bad habits.

Additionally, some find enjoyment and entertainment value in physical activity; however, such physical activity may not involve participation in an organized and officiated league, or traditional exercise routines (lifting weights, yoga classes, etc.). Instead, the enjoyment and entertainment value may be obtained through participation in sport-centric activities that are similar to training exercises discussed above but are focused on the entertain aspect (e.g., comparing goals scored against others players in a social environment compared to analyzing a player's footwork and ball-striking motion). Various entertainment embodiments will be discussed below.

This disclosure describes a networked environment that enables a player to perform programs using a specialized ball-throwing machine intended to improve a player's first touch and ball control, among other benefits and receive feedback based on recorded video of the player's performance. In one example, the networked environment may include a practice area (an open space), a ball-throwing machine, one or more targets and a plurality of cameras surrounding the practice area. The terms "program" and "training program" may be used interchangeably throughout the disclosure as embodiments of the disclosure may be either directed to social or entertainment purposes ("program") and/or directed to athletic training purposes ("training program"). Specifically, the use of "training program" or "training" with respect to an embodiment does not exclude interchangeability of the terms.

At a high level, a training program that indicates a pattern for receiving balls by the player and a movements to be performed by the player is selected. Selection of the training program may be done by the player or a trainer via a network device such as a tablet, mobile phone, or computer. The selected training program is then relayed to at least the ball-throwing machine, which throws or otherwise ejects a series of balls, in this example soccer balls, toward the player who subsequently shoots or passes each ball at a particular target (or portion of a target) based on the selected training program. The plurality of cameras may be initiated at the time the ball-throwing machine is initiated and record video of the player and each ball.

A second network device (e.g., a local computing device or a remote server device) may include logic that analyzes the video captured by the plurality of cameras to detect the movements of the player and each ball and determine the accuracy of the movements based on the selected training program. The analysis may include determinations of whether each ball was trapped properly, a particular dribble-move was accurately performed with each ball, each ball was shot or passed at the proper target accurately, etc. The results of the analysis may then be provided to the player for his/her review. The results may also be entered into a data store and combined with past analysis results to provide the player with a historical and/or cumulative view of his/her performances. In some embodiments, the analysis may be performed in real-time and result in a determination of an anticipated trajectory of each ball beyond the confines of the practice area. The anticipated trajectory may be displayed providing the player with some real-time feedback (e.g., whether the player theoretically would have scored a goal or passed to a correct virtual teammate).

In some embodiments, the ball-throwing machine may be designed to throw, lob, pitch, or otherwise eject soccer balls toward a player, who can trap the balls or practice other ball control skills. Upon receipt of the ball, the player may pass, shoot or otherwise strike the ball at a goal or at another target (such as a wall). In some instances, a wall or a projector screen may serve as the target and have displayed thereon a visual illustration of a goal, a soccer field with players, etc. For example, a display device such as a projector provides a visual illustration on a wall or a projector screen based on the selected training program (e.g., of movements to be performed, statistics, and/or an image such as a goalie standing in front of a goal). As referenced above, the analysis of the movements of the player and each ball may be performed in real-time such that an anticipated trajectory of each ball is determined. The anticipated trajectory of each ball may then be displayed by the projector on the wall or projector screen.

The game of soccer is commonly known in some countries as "football" or "association football." For convenience, this specification refers solely to the term "soccer," although such usage should be considered synonymous with "football" and "association football." Further, embodiments of the networked environments discussed below can be used or adapted for sports other than soccer, some examples of which are described below.

II. Terminology

In the following description, certain terminology is used to describe various features of the invention. For example, each of the terms "logic," "engine," and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network.

The term "computerized" generally represents that any corresponding operations are conducted by hardware in combination with software and/or firmware.

The term "object" generally relates to content (or a reference to access such content) having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. Additionally, the term object may refer to an instance of an executable that is executing ("a process"). In one embodiment, an object may be an image data such as one or more images and/or videos. In another embodiment, an object may be a set of instructions that are executable by one or more processors. The object may be retrieved from information in transit (e.g., one or more packets, one or more flows each being a plurality of related packets, etc.) or information at rest (e.g., data bytes from a storage medium).

The term "network device" may be construed as any electronic computing system with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, an endpoint (e.g., a laptop, a mobile phone, a tablet, a computer, etc.), a standalone appliance, a server, a router or other intermediary communication device, a firewall, etc.

The term "rules" refers to logic used in executing certain operations, wherein execution may vary (or not occur) based on a rule. Each rule is capable of being represented as a logical expression for example, such as an "if this, then that" statement, where "this" represents a condition, and "that" represents the conclusion. The conclusion is applied when the condition is met by analysis of parameters (predetermined or dynamically obtained). The term "implicated rules," as used herein, are the one or more specific rules applied in reaching a verdict, reflecting predetermined or dynamically obtained parameters and the conclusions drawn from them based on the logical expressions.

According to one embodiment of the disclosure, rules may also provide configuration information containing parameter values such as, for example, threshold values used in detection (e.g., specifying a time a player has a ball, a velocity of a pass or shot, a number of goals, etc.). Rules may be stored in a rules store (e.g., a repository) in persistent memory of a network device and are typically updated frequently (periodically or aperiodically).

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Figure 3:
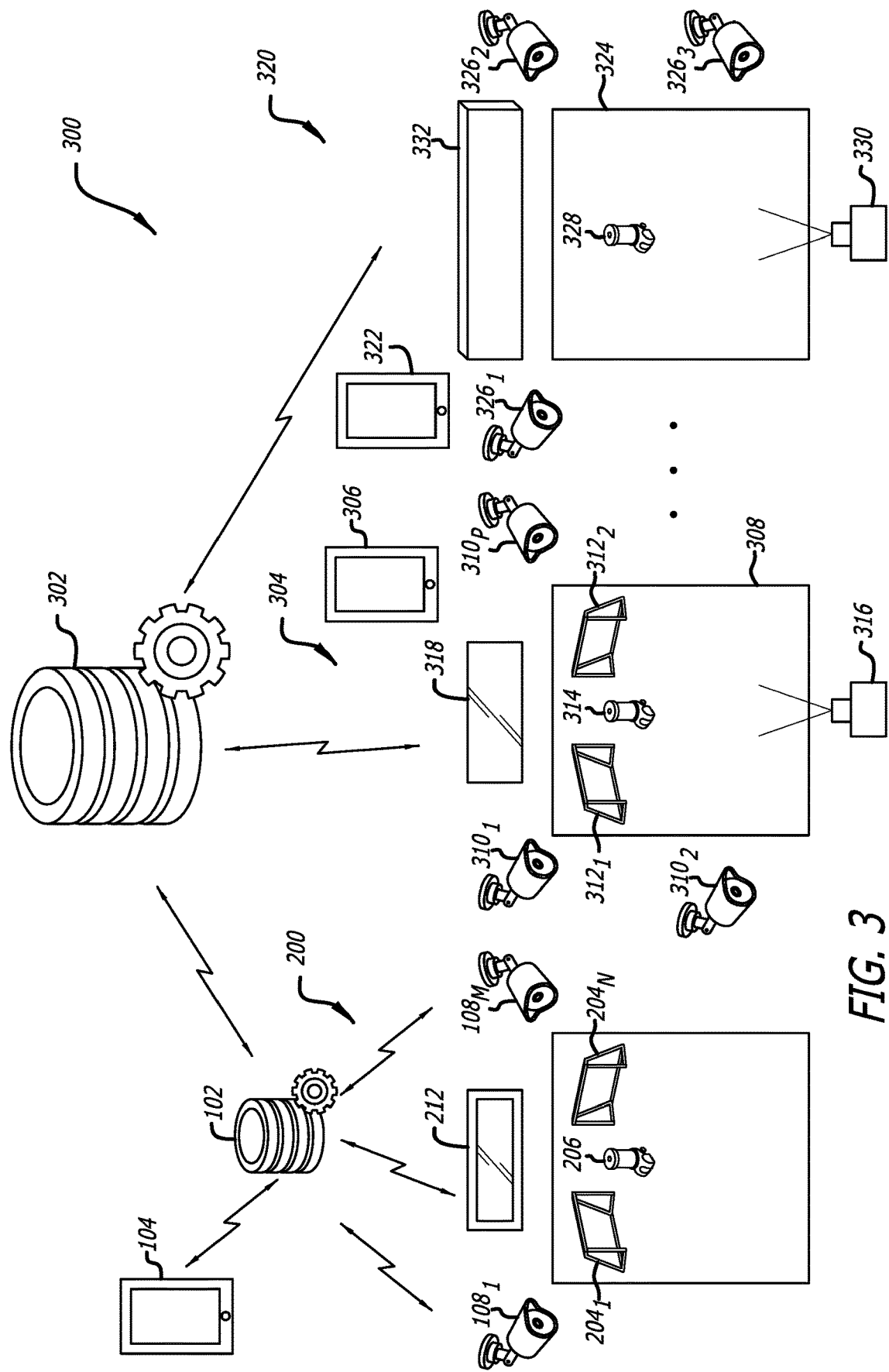
FIG. 3 illustrates an embodiment of a plurality of interconnected, networked environments including the training and entertainment ball-throwing (TEBT) system of FIG. 2, in accordance with some embodiments.

Referring to FIG. 1, an embodiment of a networked environment including a training and entertainment ball-throwing (TEBT) system is shown in accordance with some embodiments. Generally, the TEBT system 100 includes a networked resource 102, a network device 104, a playing field 106 and a plurality of camera devices $108_1$-$108_M$ (wherein M≥1, and M=2 for this example). In some embodiments, the components shown in FIG. 1 comprising the TEBT system 100 may be referred to as an "environment," wherein a first environment may be communicatively coupled with a second environment, as seen in FIG. 3. In addition in such embodiments, certain components as such a networked resource and/or a network device may be shared among two or more environments. As will be discussed with respect to FIG. 3, the networked resource 302 is shared between the environment 304 and the environment 320.

Referring to FIG. 1, the networked resource 102 may be, for example, a computer device or a server device that is configured to receive and store data related to the operations performed by components of the environment 100 or actions observed and/or captured by the components of the environment 100 (e.g., data being the visual data captured by the camera devices $108_1$-$108_M$ of a player receiving and playing a ball toward a goal). The received data may generally be referred to herein as "metrics" or "metric data." In addition, the networked resource 102 may include non-transitory computer-readable medium having stored thereon instructions that may be transmitted to other components within the environment 100 (or outside of the environment 100). For example, the networked resource 102 may have stored thereon instructions to be provided to the camera devices $108_1$-$108_M$ to begin recording.

Figure 7:
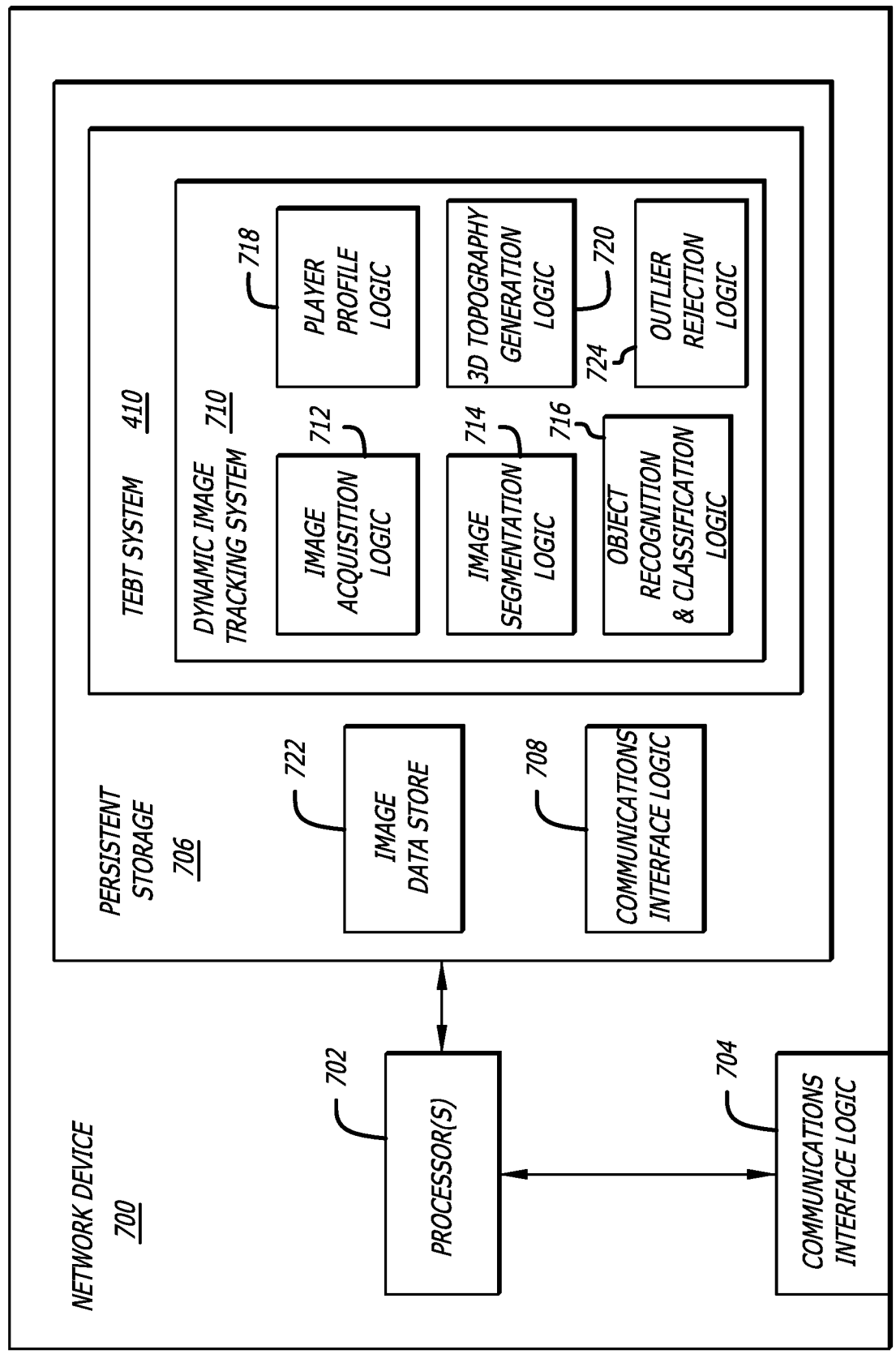
FIG. 7 illustrates an exemplary embodiment of a logical representation of a dynamic image tracking system that may be included in the training and entertainment ball-throwing (TEBT) system of FIG. 1 is shown in accordance with some embodiments.

Additionally, the networked resource 102 may include logic configured to store the metric data in one or more player profiles. The logic may perform operations to combine data stored within a player profile with newly received metric data in order to create a historical perspective. Further, as will be discussed below, a dynamic image tracking system may be included within logic of the networked resource 102 (as seen in FIG. 7 for example). The operations performed by the dynamic image tracking system as well as additional operations that may be performed by logic of the networked resource 102 will be discussed in detail below.

The network device 104 may be, for example, a mobile device or tablet that is configured to receive input from a user (e.g., a trainer). In some embodiments, the received user input may be provided to the networked resource 102 and utilized by the networked resource 102 to determine instructions to be provided to other components within the environment 100 (or external thereto). In other embodiments, the network device 104 may determine instructions to be provided to other components and either instruct the networked resource 102 as to the instructions to be provided and/or provide the instructions directly. With respect to the latter embodiment, the network device 104 may have stored thereon certain instructions to be provided to components within the environment 100.

The playing field 106 as seen in FIG. 1 is depicted as a soccer field. However, the type of playing field is not intended to be limited to a soccer field, and the sport played thereon is not intended to be limited to soccer (or otherwise referred to as football). For convenience, examples described herein use the sport "soccer"; however, embodiments of the networked environments may utilized for other sports or physical activities, including but not limited or restricted to, softball, baseball, hockey, tennis, golf, lacrosse, Frisbee, ping pong, rugby and/or basketball.

With respect to the camera devices ("cameras") $108_1$-$108_M$, the cameras $108_1$-$108_M$ are configured to receive instructions, either via wired and/or wireless communications, from the networked resource 102 and/or the network device 104. In particular, the cameras $108_1$-$108_M$ are positioned around and/or within the playing field 106 in order to capture multiple perspectives of one or more players (for purposes of ease, "player") on the playing field 106. A plurality of cameras are utilized as, at times, the movement of the player may occlude the ball and/or generally occlude moves performed by the player. As will be discussed below, the networked resource 102 may include a dynamic image tracking system that is configured to receive visual data captured by the cameras $108_1$-$108_M$ and perform processing thereon to segment a ball and a human (i.e., the player), extract features to generate a list of feature descriptors and compute surface information using photoclinometry therefrom. The depiction of the cameras $108_1$-$108_M$ in FIG. 1 should not be construed as the intended positioning of the cameras $108_1$-$108_M$, as the cameras $108_1$-$108_M$ may be positioned at various locations around the playing field 106, which may include the positioning illustrated in FIG. 1.

Figure 2:
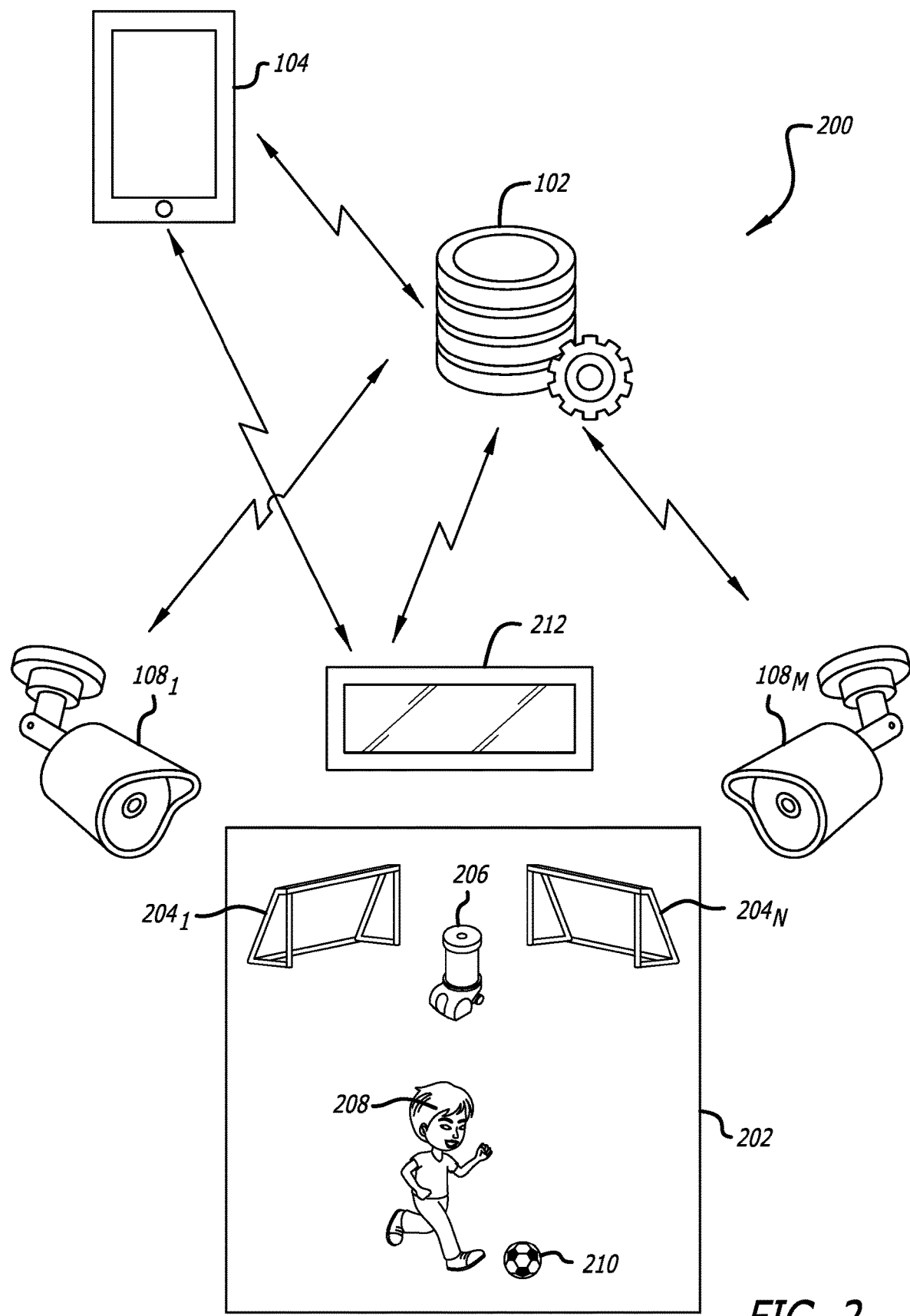
FIG. 2 illustrates a second embodiment of the networked environment including a training and entertainment ball-throwing (TEBT) system, in accordance with some embodiments.

Referring now to FIG. 2, a second embodiment of the networked environment including a training and entertainment ball-throwing (TEBT) system is shown in accordance with some embodiments. The environment 200 includes the networked resource 102, a network device 104 and the cameras $108_1$-$108_M$ of FIG. 1. In addition, the environment 200 includes a playing field 202 that may represent a soccer field, a portion of a soccer field or an area on which soccer may be played or practiced. The playing field 202 may include one or more goals $204_1$-$204_N$ (wherein N≥1, N=2 for this embodiment) and a ball-throwing machine 206.

The ball-throwing machine 206 includes an outer housing and one or more exterior wheels enabling the ball-throwing machine 206 to be easily movable. Additionally, the ball-throwing machine 206 includes a hopper that stores balls to later be ejected or thrown and a ball delivery device (e.g., one or more wheels and a motor(s)) that imparts speed, spin, and/or other features of trajectory to a ball. The motor(s) are coupled to the wheels controlling the spin of each wheel. Further, one or more actuators are included in the ball-throwing machine 206 to control an angle of the ball delivery device. The ball-throwing machine may throw a plurality of balls on the playing field 202 in accordance with a program or a training program (e.g., specified sequence of instructions). The ball-throwing machine is discussed in detail in U.S. Pat. No. 9,010,309, filed Nov. 2, 2011, titled "Ball Throwing Machine and Method," the disclosure of which is hereby incorporated herein by reference in its entirety.

An "intelligent goal" (or simply "goal") takes the concept of a traditional soccer goal and adds a plurality of sensors and, optionally, one or more lights and/or one or more speakers. In one embodiment, a goal may include two side posts and a crossbar among other supporting posts with a net coupled thereto to receive soccer balls that cross through a goal plane formed by the side posts and crossbar. The side posts and/or crossbar may each include one or more sensors that are configured to detect the presence of a soccer ball crossing the goal plane. The intelligent goal having a plurality of sensors is discussed in detail in U.S. Pat. No. 10,118,078, filed Dec. 9, 2016, titled "System, Apparatus and Method for Ball Throwing Machine and Intelligent Goal," the disclosure of which is hereby incorporated herein by reference in its entirety.

Further illustrated in FIG. 2 is a player 208 and a ball 210. In addition, the environment 200 includes a visual display device 212, e.g., a television screen or other display. The display device 212 may provide visual and/or audio instructions to the player 208. The instructions may correspond to a program selected by a trainer (or the player directly) regarding how to receive one or more balls, one or more moves to be performed with each ball, how to shoot or pass each ball, at which goal to shoot or pass, etc. The display device 212 may also provide additional information such as metric data (e.g., statistics indicating the status of the player 208 for the current program and/or in the past) and/or social data (e.g., metric data pertaining to other players, such as for competition or entertainment purposes). The display device 212 may also provide visual instructions such as examples of moves to perform, e.g., videos played in real time and/or slow motion. The visual instructions may be of a simple graphic; however, the visual instructions may be a recording of an actual person, such as of a trainer, celebrity or professional athlete performing various moves. The visual instructions may be displayed at various perspectives enabling the player 208 to obtain a complete understanding as to how to perform certain moves (e.g., where to position one's legs, etc.). The display device 212 may also provide a visual indication of a particular goal $204_1$-$204_N$ at which to pass or shoot and/or a portion of the goal $204_1$-$204_N$ at which to pass or shoot.

Further, the display device 212 may include one or more speakers for providing audio instructions that accompany the visual displays discussed above. In addition, the speakers may provide music and/or audio cues or alerts prior to, during and/or following a program. The audio and/or visual displays may be a result of instructions and/or communications provided to the display device 212 from the networked resource 102 and/or the network device 104. For instance, the user input received by the network device 104 may correspond to selection of a program (e.g., a first training program) that includes provision of a plurality of balls at varying speeds and elevations to the player 208 wherein the player 208 is to pass or shoot each ball at a particular goal $204_1$-$204_N$. In some embodiments, the user input or a representation or indication thereof may be provided to the network resource 102 from the network device 104, wherein the networked resource 102 determines and transmits specific corresponding instructions and data to the display device 212. In alternative embodiments, the network device 104 determines and transmits specific corresponding instructions and data to the display device 212. Similarly, the networked resource 102 or the network device 104 may determine and transmit specific instructions and data to cause initiation of the ball-throwing machine 206, the cameras $108_1$-$108_M$ and/or the goals $204_1$-$204_N$, when applicable.

During operations comprising performance of a first program, the cameras $108_1$-$108_M$ may capture visual data of the player 208 performing the specific moves and passing/shooting as instructed by the first program. As will be discussed below, the captured visual data may be processed to analyze movements of the player 210 in order to provide feedback as to how accurately the player 210 performed specific movements or passed/shot the ball in accordance with the first program.

Referring now to FIG. 3, an embodiment of a plurality of interconnected, networked environments including the TEBT system of FIG. 2 is shown in accordance with some embodiments. FIG. 3 illustrates a plurality of networked environments including the environment 200 of FIG. 2, the environment 304 and the environment 320, each communicatively coupled to the networked resource 302. The environment 304 includes a network device 306, a playing field 308, a plurality of cameras $310_1$-$310_P$ (wherein P≥1, P=3 for this embodiment), a plurality of goals $312_1$-$312_2$, although an alternative number of goals may be included, a ball-throwing machine 314, a display device 316 (e.g., a projector) and a visual display receiving device 318 (e.g., a projector screen). The display device 316 may cause the display of any of the displays discussed above with respect to the display device 212, wherein the visual display is displayed on the visual display receiving device 318.

In addition, the environment 320 includes a network device 322 a playing field 324, a plurality of cameras $326_1$-$326_3$, although an alternative number of cameras 326 may be included, a ball-throwing machine 328, a display device 330 (e.g., a projector) and a visual display receiving device 332 (e.g., a wall). The display device 330 may cause the display of any of the displays discussed above with respect to the display device 212, wherein the visual display is displayed on the visual display receiving device 332. In addition to the displays discussed above with respect to the display device 212, the display device 330 may operate with the visual display receiving device 332 to display a scene on the visual display receiving device 332, such as one or more goals, one or more players or other depictions. In such embodiments, the depictions may take the place of the goals $204_1$-$204_N$ or the goals $312_1$-$312_2$ such that the player shoots or passes each ball directly at the visual display receiving device 332. The cameras $326_1$-$326_3$ capture visual data of the player receiving, handling and passing/shooting the ball. The visual data is provided to the dynamic image tracking system which processes the data to determine an anticipated trajectory of the ball beyond the confines of the playing field 324 (e.g., the anticipated trajectory extending beyond the visual display receiving device 332, e.g., a wall), which is then depicted by the display device 330 on the visual display receiving device 332.

In at least the environment 320, the player may receive instruction pertaining to a selected program on the visual display receiving device 332, receive a ball from the ball-throwing machine 328, and pass or shoot the ball directly at the visual display receiving device 332 with the cameras $326_1$-$326_3$ capturing visual data thereof. The visual data is then processed by the dynamic image tracking system to determine (i) accuracy of the player's movements and ball striking, and (ii) anticipated trajectory of the ball. The anticipated trajectory of the ball is then provided to the display device 330, which causes its display on the visual display receiving device 332. Additionally, the anticipated trajectory of the ball may result in display of predetermined visuals (e.g., crowd celebrations, player movement, additional instructions, a visual summary of the player's movements and ball staking, etc.).

As referenced above, the embodiments discussed herein may be used for both athletic training purposes (e.g., to improve one's first touch of a soccer ball) as well as for entertainment purposes within a social environment. As one example of the former, the environments of FIG. 3 may represent practice areas within one or more training facilities in which video of each ball thrown to a player and the player's subsequent movements during a training session is recorded by the plurality of cameras. The video may be then analyzed to determine not only the accuracy at which the player performed a training program within the training session but also the form and speed of the player's movements. Thus, FIG. 3 may be implemented to present a plurality of environments directed to an athletic training purpose.

However, in some embodiments, one or more of the environments of FIG. 3 may be implemented to provide users with a social environment revolving around soccer. For instance, one or more of the environments may enable selection of various video games to be display on the corresponding display device or display receiving device (e.g., where the display receiving device displays a meteor field and the player is to shoot soccer balls at meteors). Additionally, multi-player games may be provided (wherein the players may take turns in the same environment, or may be located remotely in separate environments, potentially hundreds or thousands of miles apart). There is no limit on the type or number of programs that may be provided (as either training-focused programs or social-oriented programs).

IV. Logical Representation

Figure 4:
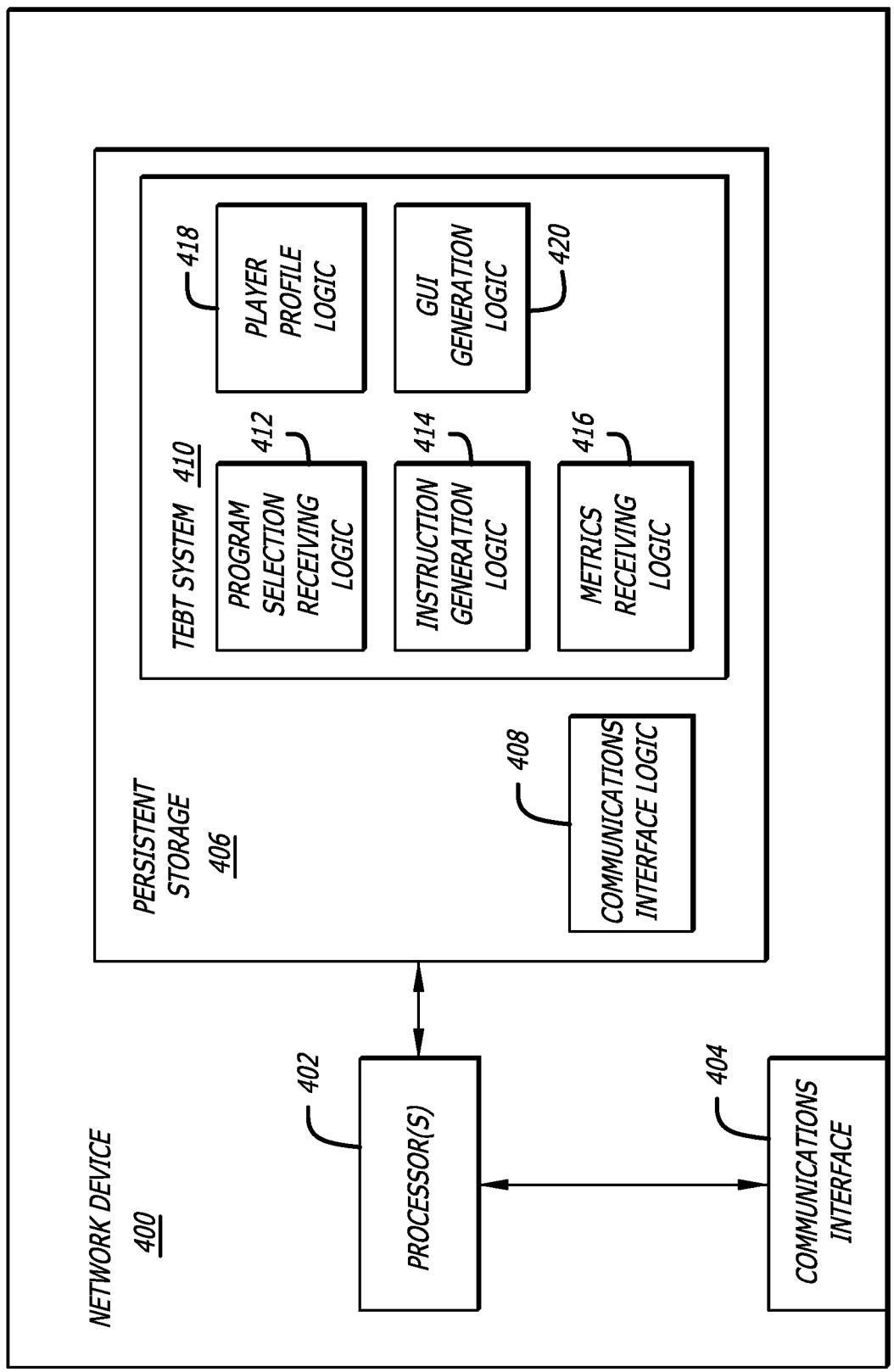
FIG. 4 is an exemplary embodiment of a logical representation of the training and entertainment ball-throwing (TEBT) system of FIG. 1, in accordance with some embodiments.

Referring now to FIG. 4, an exemplary embodiment of a logical representation the training and entertainment ball-throwing (TEBT) system of FIG. 1 is shown in accordance with some embodiments. The network device 400, in an embodiment, may include a housing, which may be made entirely or partially of a hardened material (e.g., hardened plastic, metal, glass, composite or any combination thereof) that protects the circuitry within the housing, namely one or more processors 402 that are coupled to a communication interface 404 via a first transmission medium. The communication interface 404, in combination with a communication logic 408, enables communications with external network devices to receive communications as well as updates for the TEBT system 410. According to one embodiment of the disclosure, the communication interface 404 may be implemented as a physical interface including one or more ports for wired connectors. Additionally, or in the alternative, the communication interface 404 may be implemented with one or more radio units for supporting wireless communications with other electronic devices. The communication interface logic 408 may include logic for performing operations of receiving and transmitting one or more objects via the communication interface 404 to enable communication between the TEBT system 410 and network devices via a network (e.g., the internet) and/or cloud computing services, not shown.

The processor(s) 402 is further coupled to a persistent storage 406 (e.g., non-transitory, computer-readable medium) via a second transmission medium. According to one embodiment of the disclosure, the persistent storage 406 may have stored thereon the TEBT system 410, which may include the following logic modules: a program selection receiving logic 412, an instruction generation logic 414, a metrics receiving logic 416, a player profile logic 418, and a graphical user interface (GUI) generation logic 420. The operations of these software modules, upon execution by the processor(s) 402, are described above. Of course, it is contemplated that some or all of this logic may be implemented as hardware, and if so, such logic could be implemented separately from each other.

Figure 5:
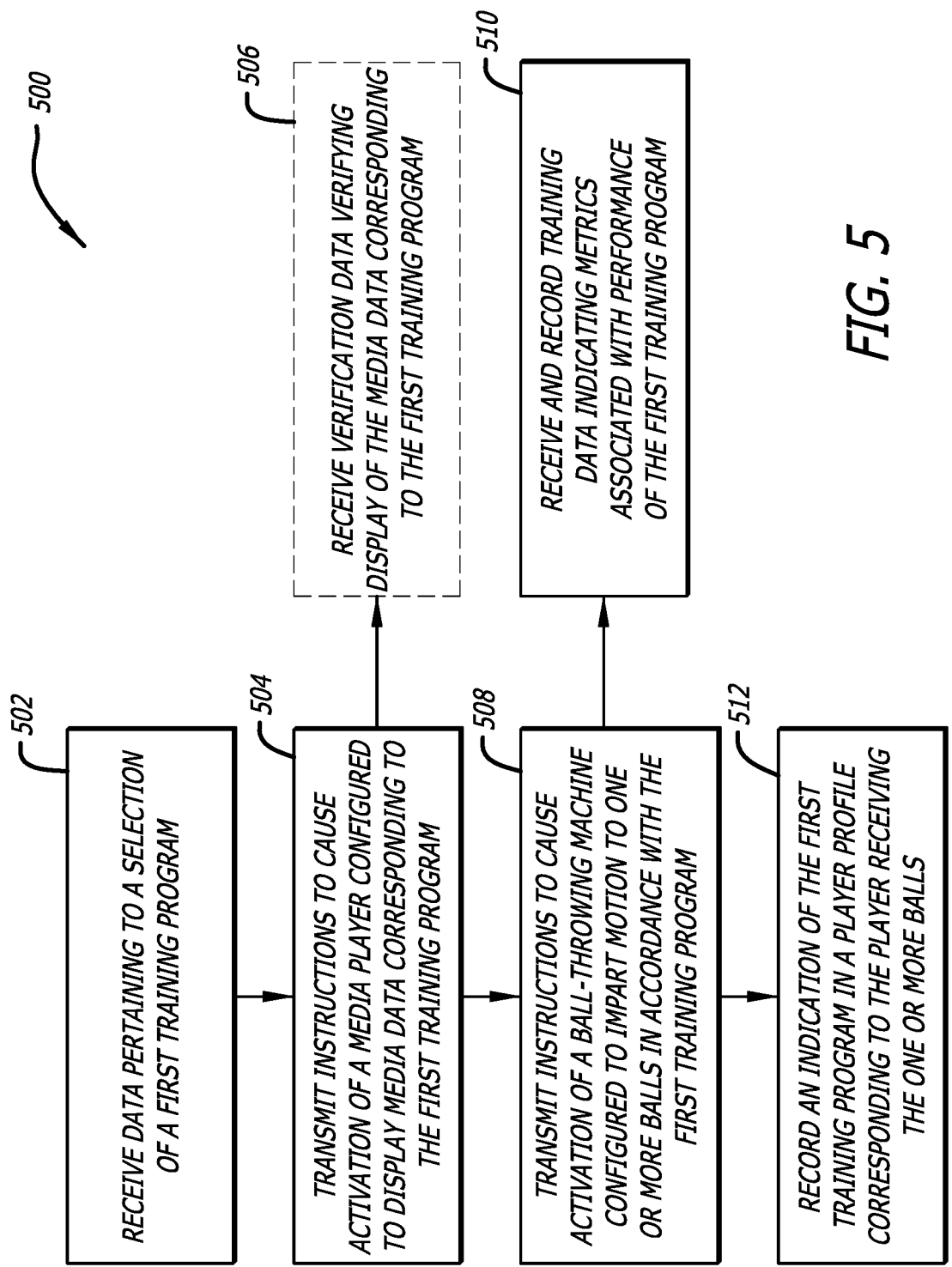
FIG. 5 is an exemplary embodiment of a first flowchart illustrating operations of the training and entertainment ball-throwing (TEBT) system of any of FIGS. 1-4, in accordance with some embodiments.

Referring to FIG. 5, an exemplary embodiment of a first flowchart illustrating operations of the training and entertainment ball-throwing (TEBT) system of any of FIGS. 1-4 is shown in accordance with some embodiments. Each block illustrated in FIG. 5 represents an operation performed in the method 500 performed by a TEBT system, such as any of the TEBT systems 100, 200, 320 and/or 410. It should be understood that not every operation illustrated in FIG. 5 is required. In fact, the transmission of certain sets of instructions may be optional to complete aspects of the method 500. The discussion of the operations of method 500 may be done so with reference to any of FIGS. 1-4.

Herein, the method 500 starts when data pertaining to a selection of a first training program is received (block 502). The first training program may refer to a predetermined (although optionally dynamically adjustable) program that corresponds to instructions for display of visual data, playing of audio data, and/or initiation of a sequence performed by a ball-throwing machine. For example, the first training program may be directed to training or entertainment purposes. Following the receipt of the data pertaining to the selection of the first training program, the method 500 includes transmitting instructions to cause the activation of a media player configured to display visual data corresponding to the first training program (block 504). The term "media player" may refer to any of the display device 212 (e.g., a television or other network device having or connected to a display screen) and/or the projectors 316 and 330.

Transmission of the instructions may include media data of the first training program from the network device 104, 306 or 322 to the media player (directly or via the network resource 102 or 302). Alternatively, the instructions transmitted may include an indication of media data to display, wherein the media data is stored on the media player, or is at least accessible by the media player, e.g., stored on a remote, non-transitory computer-readable medium. The indication of the media data may include a name of the media data file to be displayed or other unique identifier.

Optionally, following the transmission of instructions causing activation of a media player, the method 500 may include the receipt of verification data that verifies the display of the visual data corresponding to the selected first training program (block 506). Transmission of verification data from the media player to the sending network device or network resource is an optional feature.

In addition to the transmission of instructions to cause display of visual data, the method 500 includes transmitting instructions to cause the activation of a ball-throwing machine configured to impart motion to one or more balls in accordance with the selected first training program (block 508). Transmission of the instructions may include a ball-throwing sequence of the first training program from the network device 104, 306 or 322 to the ball-throwing machine 206, 314 or 328 (directly or via the network resource 102 or 302). Alternatively, the instructions transmitted may include an indication of ball-throwing sequence to be performed, wherein the ball-throwing sequence is stored on the ball-throwing machine 206, 314 or 328, or is at least accessible by the ball-throwing machine 206, 314 or 328, e.g., stored on a remote, non-transitory computer-readable medium. The indication of the ball-throwing sequence may include a name of a file to be executed or other unique identifier.

Following the transmission of instructions causing activation of the ball-throwing machine, the method 500 may include the receipt and recordation of data indicating metrics associated with performance of the selected first training program (block 510). The recorded data may include any parameters or statistics associated with the first training program including, but not limited or restricted to, a ball count, a recording of how each ball was thrown (speed, direction, angle, loft, etc.), number of goals scored in accordance with the first training program (e.g., accurate goal received the corresponding ball), location of scored goal (e.g., upper, middle, bottom of goal), various timestamps (start/stop of first training program, for each ball thrown, for each goal, etc.), a recording of any dynamic alterations made to the first training program (e.g., based user input from a trainer/player, based on data from sensors such as cameras, wearables such as a heartrate monitor, etc.) wherein an alteration may include any change to the first training program such as a number of balls throwing, how each ball is thrown, the interval between balls, etc.). The recorded data may be obtained from any source (based applicability) including manual user input, recorded and analyzed video content, obtained sensor data (from wearables and/or sensors within an intelligent goal).

Finally, following the transmission of instructions causing activation of the ball-throwing machine, the method 500 includes recording an indication of at least partial performance of the selected first training program in a user profile corresponding to the user receiving the one or more balls (block 512). Any of the recorded data discussed with respect to block 510 may be incorporated into a player profile. The incorporation may include: (i) combining the recorded data with previously stored data so as to develop a cumulative history of a player's training, and/or (ii) individual recordation to enable retrieval of data pertaining to one or more training sessions. The player profile may be stored in cloud storage and retrievable via any network device (e.g., by providing authentication credentials).

Figure 6:
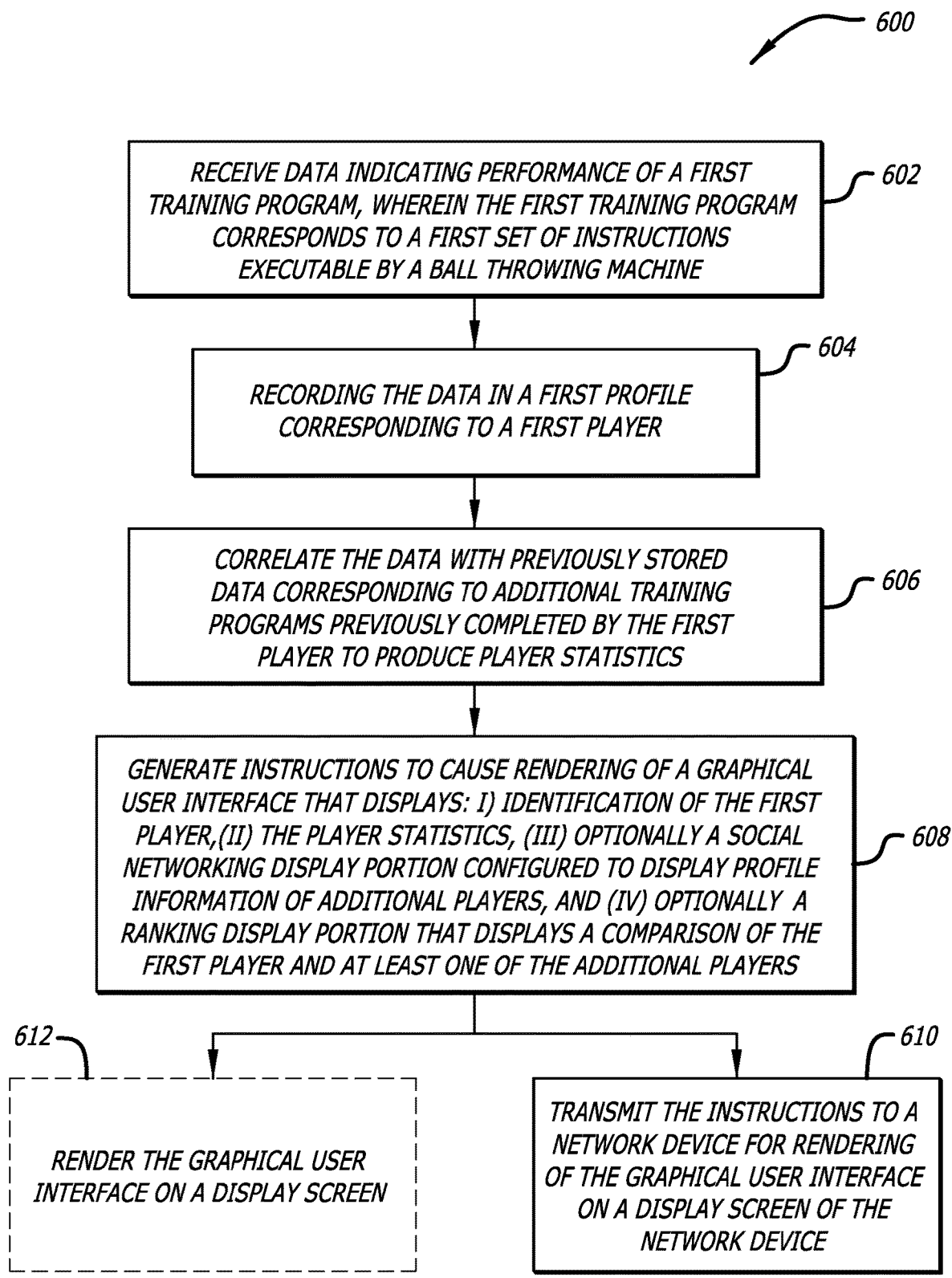
FIG. 6 illustrates an exemplary embodiment of a second flowchart illustrating operations of the training and entertainment ball-throwing (TEBT) system of FIG. 1, in accordance with some embodiments.

Referring to FIG. 6, an exemplary embodiment of a second flowchart illustrating operations of the training and entertainment ball-throwing (TEBT) system of FIG. 1 is shown in accordance with some embodiments. Each block illustrated in FIG. 6 represents an operation performed in the method 600 performed by a TEBT system, such as any of the TEBT systems 100, 200, 320 and/or 410. Herein, the method 600 starts when data indicating performance of a first program is received (block 602). As discussed above with respect to FIG. 5, the first program may refer to a predetermined (although optionally dynamically adjustable) program, which may be, for example, a training program or an entertainment program. In the embodiment illustrated in FIG. 6, the first program corresponds to at least a first set of instructions that are executable by a ball-throwing machine.

Following receipt of the data indicating performance of a first program, the received data is recorded in a user profile corresponding to a first user, i.e., the user receiving one or more balls thrown by the ball-throwing machine (block 604). Upon the addition of the received data to the user profile, the received data is correlated with previously stored data within the user profile corresponding to additional programs previously completed, or partially completed, by the first user to produce updated user statistics (block 606).

Following the generation of the updated user statistics, instructions that cause the rendering of a GUI are generated (block 608). In some specific embodiments, the GUI may display at least an identification of the user and the updated user statistics. Additionally, as an optional feature, the GUI may display a social networking aspect that includes profile information of additional users, and/or a ranking display that illustrates a comparison of a plurality of users, optionally including the first user.

In one embodiment, following the generation of the instructions to cause the rendering of a GUI, the instructions are transmitted to a network device for the rendering of the GUI on a display screen of the network device (block 610). For example, the network device may be a user's mobile device or tablet. Optionally, the GUI may be rendered on a display screen (block 612). More specifically in such an embodiment, the GUI may be rendered on a display screen of a local computing device (e.g., a laptop or desktop computer) that either includes or is coupled to a display screen, wherein the local computing device may perform one or more of the operations discussed with respect to blocks 602-610.

V. Dynamic Image Tracking System Logical Representation

Referring now to FIG. 7, an exemplary embodiment of a logical representation of a dynamic image tracking system that may be included in the TEBT system of FIG. 1 is shown in accordance with some embodiments. The network device 700, in an embodiment, may include a housing, which may be made entirely or partially of a hardened material (e.g., hardened plastic, metal, glass, composite or any combination thereof) that protects the circuitry within the housing, namely one or more processors 702 that are coupled to a communication interface 704 via a first transmission medium. The communication interface 704, in combination with a communication logic 708, enables communications with external network devices to receive communications as well as updates for the dynamic image tracking system 710. According to one embodiment of the disclosure, the communication interface 704 may be implemented as a physical interface including one or more ports for wired connectors. Additionally, or in the alternative, the communication interface 704 may be implemented with one or more radio units for supporting wireless communications with other electronic devices. The communication interface logic 708 may include logic for performing operations of receiving and transmitting one or more objects via the communication interface 704 to enable communication between the dynamic image tracking system 710 and network devices via a network (e.g., the internet) and/or cloud computing services, not shown.

The processor(s) 702 is further coupled to a persistent storage 706 (e.g., non-transitory, computer-readable medium) via a second transmission medium. According to one embodiment of the disclosure, the persistent storage 706 may have stored thereon the dynamic image tracking system 710, which may include the following logic modules: an image acquisition logic 712, an image segmentation logic 714, an object recognition and classification logic 716, a distance computation logic 718, a three-dimensional (3D) topography generation logic 720 and an outlier rejection logic 724. The TEBT system 410 may include, or have access to, an image data store 722 that may store data (still images and/or video). Various logic modules of the TEBT system 410 may query the image data store 722 to retrieve or otherwise manipulate data stored therein. Recording of various data extracted or determined with respect to the images or video stored on the image data store 724 is discussed below and such recordings may be stored in the image data store 724. The operations of these software modules, upon execution by the processor(s) 702, are described below with respect to various example embodiments. Of course, it is contemplated that some or all of this logic may be implemented as hardware, and if so, such logic could be implemented separately from each other.

VI. Dynamic Image Tracking System Exemplary Methodology

Figure 8A:
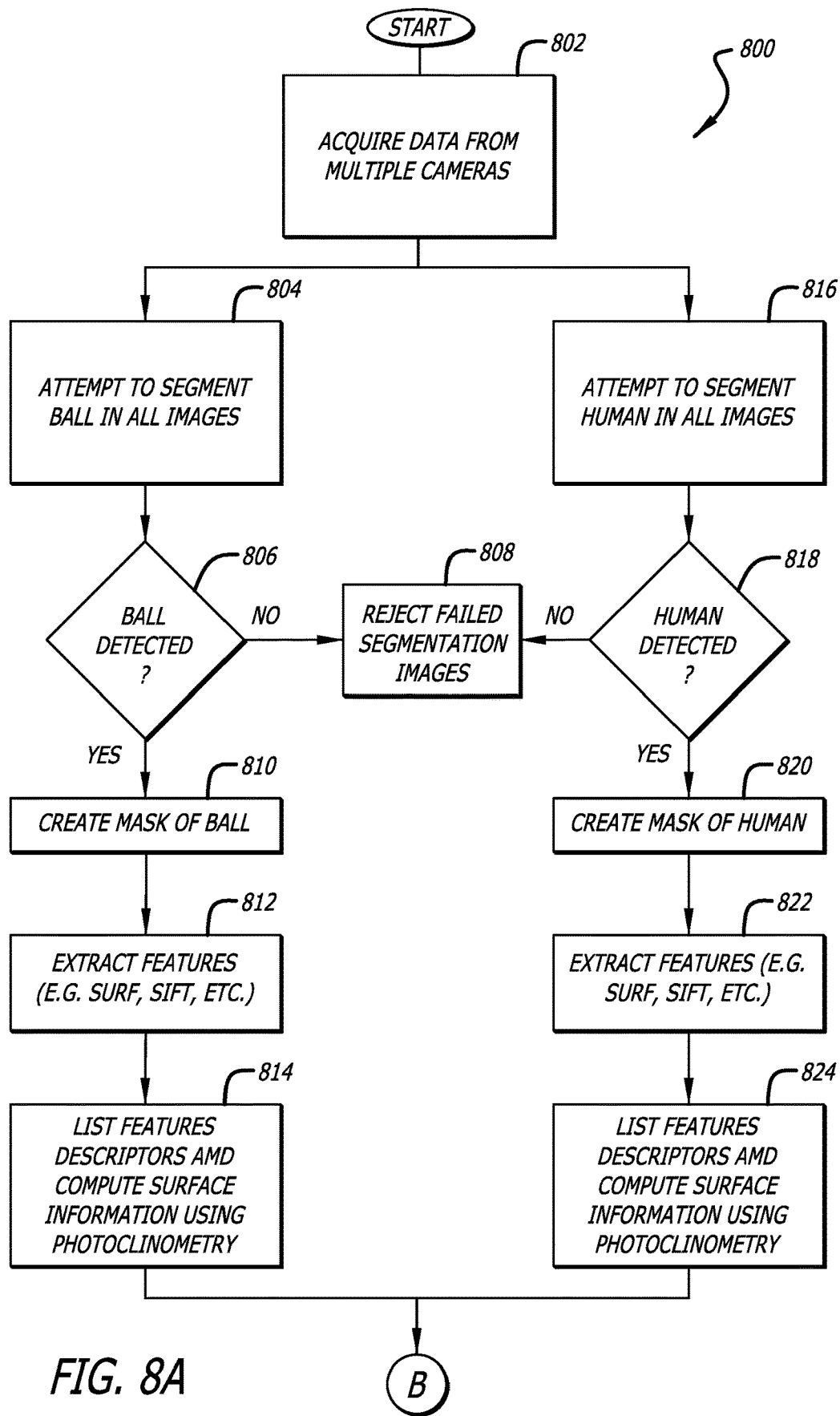
FIGS. 8A-8B illustrate an exemplary embodiment of a first flowchart illustrating operations of dynamic image tracking system of FIG. 7 in accordance with some embodiments.
Figure 8B:
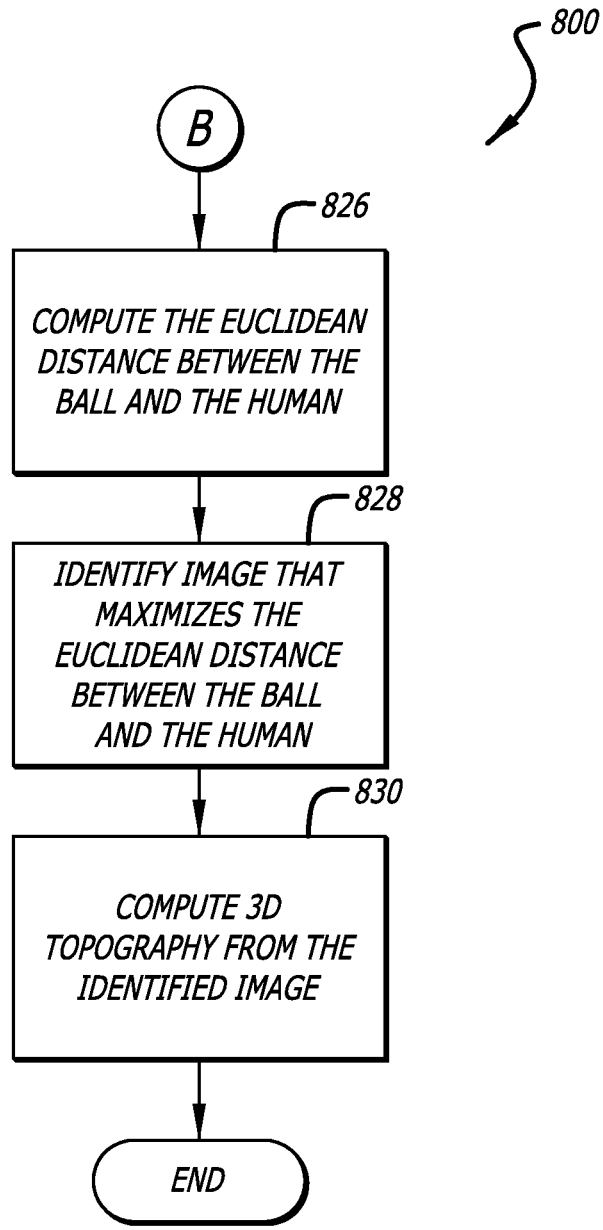

Referring now to FIGS. 8A-8B, an exemplary embodiment of a first flowchart illustrating operations of dynamic image tracking system of FIG. 7 is shown in accordance with some embodiments. Each block illustrated in FIGS. 8A-8B represents an operation performed in the method 800 of performing dynamic image tracking. Herein, the method 800 starts when data is acquired from a plurality of cameras, e.g., the cameras $108_1$-$108_M$ of FIG. 1 (block 802). In particular, the data may comprise a series of still images or video data. When the data comprises video data, the dynamic image tracking system may extract individual frames from the video data, wherein each frame represents a still image. Following the acquisition of data from the plurality of cameras, the method may perform operations comprising two separate paths, starting with blocks 804 and 814 respectively, as seen in FIG. 8A. In some embodiments, the two paths may be performed in parallel. However, in other embodiments, the two paths may be performed serially or concurrently (at least overlapping in time).

Although the paths may be performed in either order, the path starting block 804 will be discussed first. Referring to a first path, with the dynamic image tracking system attempts to segment the ball in each of the images (block 804). The segmentation of the ball or balls may be made up of various embodiments or a combination of embodiments depending on the modus operandi. In one embodiment the segmentation process may be a rule-based system that differentiates the ball or balls from the background using a color space thresholding, contrast thresholding, illumination thresholding or any other such expert method that is fine-tuned accordingly to create a binary image. The rules may be generated based on experiential knowledge. Other rule-based systems have been contemplated and are within the scope of the disclosure. The size, location and any other relevant features of each separate or disjointed object within each image is then recorded.

In another embodiment, the ball segmentation process may be based on shape recognition. In such an embodiment, logic of the dynamic image tracking system analyzes each image for circular objects within the each images and records certain data, including but not limited or restrict to, a size, a location and any other relevant features of these circular objects.

In yet another embodiment, the ball segmentation process may involve a background subtraction method (also referred to as "foreground detection"). Such a method includes generating an "understanding" of the background utilizing multiple previous images or a duration of video made up of multiple frames, to create a background image. For example, a template background image may be generated by comparing pixels from a plurality of previous images such that a determination is made as to whether each pixel is represented by a common value across the plurality of images (e.g., indicating that the pixel corresponds to a still region, e.g., non-moving object). The template, e.g., the understanding, may be considered to be the background image. The image being processed is subsequently subtracted from the background image with the resultant output being a binary image of what is not considered background. In essence, this method detects objects that have either changed position in respect to the background or were introduced into the image. This method is also known as motion detection. Similarly, to other embodiments, a size, a location and any other relevant features of each object may then be recorded.

In yet another embodiment a machine learning or artificial intelligence method may be employed. Such a method may utilize a pre-trained object classifier, such as but not limited to, the You-Only-Look-Once (YOLO) library or any other machine learning or artificial intelligence method configured to classify and/or recognize an object, such as a ball, within an image. If a non-pre-trained artificial intelligence logic module is used, a dataset of images containing balls is first collected and annotated for training of the artificial intelligence logic module. Additionally, a dataset of other objects that may be found in the images may be collected and annotated for additional training. Most of the datasets are subsequently used to train the machine learning classifier while the remainder are used to test and validate the resultant classifier. Similar to other embodiments, the size, location and any other relevant features of each object is recorded.

In any of the embodiments discussed above, an outlier rejection logic 724 may be included in and employed by the dynamic image tracking system to refine the selection of the intended object (e.g., a ball) based on the recorded features. The outlier rejection logic 724 may perform operations including a semantic classification based on the recorded features described above. A first set of features of the recorded features (determined via experiential knowledge) are selected based on higher level thematic descriptors such as Hu invariant moments. The semantic classification may include computerized operations that determine a set of feature descriptor values that define the object. For example, a soccer ball may have: a roundness feature descriptor value of approximately 1; a "perimeter over area" feature descriptor value of approximately $2r/r^2$ (wherein 'r' refers to the radius of the object); a bounding box ratio feature descriptor value of approximately 1:1; and a skewness feature descriptor value of approximately 0. The values that define certain objects, such as a soccer ball, may be determined via experiential knowledge and/or machine learning.

The process of selecting the first set of features includes selection of features in accordance with experiential knowledge and based on variation and distribution of the feature descriptors to determine the median and upper/lower thresholds thereof for a particular installation. Factors considered for a particular installation include the size of the studio, the positioning of the cameras, the lenses used, and camera parameters. In some embodiments, the selection process may be via machine learning algorithms. In other embodiments, one or more predetermined rule sets may utilizes to select a set of features. In other embodiments, manual selection may be utilized. In yet further embodiments, a combination of machine learning techniques, predetermined rule sets and/or manual selection may be utilized.

In some embodiments, the thematic descriptors are made up of 7 values. The thematic descriptor values may be compared to the feature descriptor values and thresholds discussed above. If the thematic descriptor values are outside a corresponding threshold then the feature under analysis is determined to not be a representation of the desired object. Following analysis, these thematic descriptors are compared to a template representing the first features that represent a ball. Following the comparison, each detected object is presented in a listed that is ordered by a closest match to the template. In addition, the outlier rejection logic 724 operations may include performance of RANSAC, K-Means Clustering, K-Nearest Neighbor, etc.

Following segmentation of the ball in each of the images, the dynamic image tracking system makes a determination with respect to each image as to whether a ball was detected (block 806). The determination may involve a thresholding of the template matching process (e.g., the background subtraction process) discussed above, a voting process of the most closely matched features or any other relevant method that determines whether the selected feature or features represent a ball. In one embodiment, the voting process in determining the "most closely matched features" includes operations of determining the set of features having the lowest standard deviation from the template discussed above.

When a ball is not detected in an image, the image is rejected, e.g., no longer in consideration with respect to the first path (block 808). However, when a ball is determined to be present within an image, the dynamic image tracking system creates a mask of the ball (block 810). The mask is made up of, for example, zeros, "Not a Number" (NaN) values or any other identifier that indicates one or more pixels (which may be referred to as a "region") is not a Region of Interest (RoI) on the areas that do not contain the detected ball. In contrast, the regions determined to contain a ball are filled with each pixel's original pixel value.

Following the creation of the mask of the ball, features are extracted for each image in which a ball is detected (block 812). In performing the feature extraction, various feature extraction algorithms may be utilized including Speeded-Up Robust Features (SURF), Harris Corner Detector and Scale-Invariant Feature Transform (SIFT); however, other feature extraction algorithms have been contemplated and are within the scope of the disclosure. In some embodiments, the features are only extracted for the RoI, which results in a lower computational cost and, hence, improved performance of the method 800.

Following the creation of the mask of the ball and the performance of feature extraction operations, the feature descriptors are listed and surface information is computed using photoclinometry (block 814). In some embodiments, operations comprising a photoclinometry process are performed that transform a 2D image into a surface map representing varying depth within the 2D image. The operations further recreate a 3D relief of the ball from one or more images. From the 3D relief, detailed pixel-based features are extracted. In some embodiments, the detailed pixel-based features may be derived from Harris Corners as determined any of the SIFT, Harris Corner Detector and/or SURF operations; however, the photoclinometry processing results in the addition of a 3rd dimension to the Harris Corners to generate the detailed pixel-based features. Therefore, the detailed pixel-based features may be analyzed in 3D space (3×2D rotations). 3×2D rotation may refer to the roll (rotation around a front-to-back axis), pitch (rotation around a side-to-side axis) and yaw (rotation around a vertical axis); however, the rotations are typically concurrent, not serial and, thus, refer to a rigid body.

Determining the 3D structure of the ball will lead to a more accurate approximation of a Euclidean distance discussed below. In addition, the photoclinometry process also enables additional information to be extracted such as but not limited to, ball spin and forces acting on the ball based on changes in pixel values extracted from the RoI within a group images (e.g., within a specific time frame).

Referring to a second path beginning with block 816, the dynamic image tracking system attempts to segment one or more users in each of the images (block 816). Although a plurality of users (or "players") may utilize a single environment concurrently, the method 800 will use the phrase "user" for the sake of clarity and convenience; however, the disclosure is not intended to be limited to a single user and instead applies equally to a plurality of concurrent users as the same process applies for a first user as for a second user. The segmentation strategies utilized in the second path are similar to those of the first path, however, the machine learning method as described may provide more accurate results due to the variation in the appearance of a user. However, other feature extraction processes have been contemplated and are within the scope of the disclosure. The resultant of block 816 is a list containing bounding box information that indicates the position of the user. The bounding box information may include an Axis-aligned minimum bounding box for the user, which may be defined as the user's minimum bounding box subject to the constraint that the edges of the box are parallel to the (Cartesian) coordinate axes.

Following segmentation of the user in each of the images, the dynamic image tracking system makes a determination with respect to each image as to whether a user was detected (block 818). The system utilizes the output of the previous block (block 816) as a logical truth table to determine if the image contains a user. In some embodiments, the logical truth table refers to whether a bounding box representation may be found within the list containing the bounding box information for the image. When a bounding box is available, then the image and information is used.

When a user is not detected in an image, the image is rejected. e.g., no longer in consideration with respect to the second path (block 808). However, when a user is determined to be present in an image, the dynamic image tracking system creates a mask of the user in a similar manner as discussed with respect to block 810 (block 820). For each masked image, detailed pixel-based features are extracted in a similar manner as discussed with respect to block 812 (block 822).

Following the creation of the mask of the user and the performance of feature extraction operations, the feature descriptors are listed and surface information is computed using photoclinometry (block 824). In a similar manner as discussed above with respect to block 814, operations comprising a photoclinometry process transform a 2D image into a surface map representing varying depth within the 2D image. Further, the options recreate a 3D relief of the user from one or more images. From the 3D relief, detailed pixel-based features are extracted. Determining the 3D structure of the user will lead to a more accurate approximation of a Euclidean distance discussed below.

Referring now to FIG. 8B, subsequent to the completion of the computation of the surface information with respect to both the ball and the user, the method 800 continues with the computation of the Euclidean distance between the ball and the user (block 826). The features contain three-dimensional information enabling the relationship (e.g., a "straight line distance") between the ball and the user to be extrapolated in the form of three distances made up of a maxima value, a minima value, and a mean value. The three distances may include: the maxima (the largest Euclidean distance between the edges of the two objects); the minima (the smallest Euclidean distance between the edges of the two objects); and the mean (the Euclidean distance between the centroids of the two objects).

Once the Euclidean distance has been determined for each image, the image that maximizes the Euclidean distance between the ball and the user is identified (block 828).

In determining the image that maximizes the Euclidean distance, the images are ranked against each other. In some embodiments, the minima is considered first, such that when a first image has a larger minima value than a second image, the first image is placed above the second image in a ranking (e.g., a list). Such a comparison is performed between each image.

When two images have similar minima values, then the mean is considered when comparing the two images (e.g., the image with the larger mean is ranked above the other). The term "similar" may be within a predefined threshold of each other. Further, when both the minima and mean are similar (according to corresponding minima and mean thresholds), the maxima is considered (e.g., the image with the larger maxima is ranked above the other). Should all three values be the same or similar based on the corresponding thresholds, then the image timestamp (in nano seconds) is considered, wherein preference for ordering based on timestamps (e.g., earlier or later) may be provided as a default setting or extracted from a configuration file.

Using the image that maximizes the Euclidean distance between the ball and the user is identified, a three-dimensional (3D) topography is computed based on the image (block 830). This utilizes triangulation techniques to determine the position of the ball and user in three-dimensional space; thus, in some embodiments, the topography of the entire image is not computed resulting in lower computational cost and improved performance. In addition, should more than two images selected for the image pair utilized in block 830 be determined to include the ball and/or the user, these additional images may be used as a validation of the triangulation computation.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method for adaptive utilization of a ball-throwing machine in conjunction with a media player, the method comprising:

receiving, by control logic, data pertaining to selection of a first training program;

transmitting, by the control logic, media instructions to cause activation of the media player, wherein the media player is configured to display visual data corresponding to the first training program;

transmitting, by the control logic, ball-throwing instructions to cause activation of the ball-throwing machine configured to impart motion to one or more balls in accordance with the first training program;

obtaining, by the control logic, image data of an interaction between a first player and a first ball of the one or more balls, wherein the interaction includes at least receipt of the first ball by the first player or a striking of the first ball by the first player; and responsive to receiving the image data, performing, by the control logic, operations of generating and transmitting second media instructions to cause updating of the visual data by the media play, wherein the updating includes display of an indication of an accuracy of the interaction relative to instructions of the first training program.

2. The method of claim 1, further comprising:

recording an indication of the first training program in a player profile.

3. The method of claim 1, further comprising:
recording training data indicating metrics associated with performance of the first training program.

4. The method of claim 3, wherein the training data includes a number of the one or more balls delivered and a trajectory of each of the one or more balls delivered.

5. The method of claim 1, wherein the first training program includes an indication of movements to be performed by the first player upon receipt of the first ball of the one or more balls.

6. The method of claim 5, further comprising:
performing, by the control logic, an analysis of the image data resulting in detection of movements of the first player, and a determination as to whether movements of the first player correspond to the indication of movements to be performed by the first player included in the first training program.

7. The method of claim 1, further comprising:
performing, by the control logic, a second analysis of the image data resulting in determination of a speed of movements of the first player.

8. A system comprising:
a ball-throwing machine configured to impart motion to one or more balls;
a media player; and
one or more logic modules stored on a non-transitory storage medium, the one or more logic modules including instructions, upon execution by one or more processors, perform operations including:
receiving data pertaining to selection of a first training program;
transmitting media instructions to cause activation of the media player, wherein the media player is configured to display visual data corresponding to the first training program;
transmitting ball-throwing instructions to cause activation of the ball-throwing machine configured to impart motion to one or more balls in accordance with the first training program;
obtaining image data of an interaction between a first player and a first ball of the one or more balls, wherein the interaction includes at least receipt of the first ball by the first player or a striking of the first ball by the first player; and
responsive to receiving the image data, performing operations of generating and transmitting second media instructions to cause updating of the visual data by the media play, wherein the updating includes display of an indication of an accuracy of the interaction relative to instructions of the first training program.

9. The system of claim 8, further comprising:
recording an indication of the first training program in a player profile.

10. The system of claim 8, further comprising:
recording training data indicating metrics associated with performance of the first training program.

11. The system of claim 10, wherein the training data includes a number of the one or more balls delivered and a trajectory of each of the one or more balls delivered.

12. The system of claim 8, wherein the first training program includes an indication of movements to be performed by the first player upon receipt of the first ball of the one or more balls.

13. The system of claim 12, further comprising:
performing, by the control logic, an analysis of the image data resulting in detection of movements of the first player, and a determination as to whether movements of the first player correspond to the indication of movements to be performed by the first player included in the first training program.

14. The system of claim 8, further comprising:
performing, by the control logic, a second analysis of the image data resulting in determination of a speed of movements of the first player.

15. A non-transitory, computer-readable storage medium having stored thereon instructions that, when executed by a processing device, cause performance of operations including:
receiving data pertaining to selection of a first training program;
transmitting media instructions to cause activation of the media player, wherein the media player is configured to display visual data corresponding to the first training program;
transmitting ball-throwing instructions to cause activation of the ball-throwing machine configured to impart motion to one or more balls in accordance with the first training program;
obtaining image data of an interaction between a first player and a first ball of the one or more balls, wherein the interaction includes at least receipt of the first ball by the first player or a striking of the first ball by the first player; and
responsive to receiving the image data, performing operations of generating and transmitting second media instructions to cause updating of the visual data by the media play, wherein the updating includes display of an indication of an accuracy of the interaction relative to instructions of the first training program.

16. The non-transitory, computer-readable storage medium of claim 15, further comprising:
recording an indication of the first training program in a player profile.

17. The non-transitory, computer-readable storage medium of claim 15, further comprising:
recording training data indicating metrics associated with performance of the first training program.

18. The non-transitory, computer-readable storage medium of claim 17, wherein the training data includes a number of the one or more balls delivered and a trajectory of each of the one or more balls delivered.

19. The non-transitory, computer-readable storage medium of claim 18, wherein the first training program includes an indication of movements to be performed by the first player upon receipt of the first ball of the one or more balls, and
wherein the operations further include:
performing an analysis of the image data resulting in detection of movements of the first player, and a determination as to whether movements of the first player correspond to the indication of movements to be performed by the first player included in the first training program.

20. The non-transitory, computer-readable storage medium of claim 15, further comprising:
performing a second analysis of the image data resulting in determination of a speed of movements of the first player.

* * * * *